United States Patent

[11] 3,589,415

[72] Inventor Norman C. Locati
Lake Oswego, Oreg.
[21] Appl. No. 875,700
[22] Filed Nov. 12, 1969
[45] Patented June 29, 1971
[73] Assignee Omark Industries, Inc.
Portland, Oreg.

[54] CHAIN SAW BAR
5 Claims, 5 Drawing Figs.
[52] U.S. Cl. .................................................. 143/32
[51] Int. Cl. ............................................. B27b 17/04
[50] Field of Search ............................................... 143/32, 32 H

[56] References Cited
UNITED STATES PATENTS
3,334,670 8/1967 Merz ........................... 143/32 H Primary Examiner—Donald R. Schran
Attorney—Robert L. Harrington ABSTRACT: A chain saw bar having a sprocket rotatably mounted in the nose of the saw bar guiding a saw chain around the outer end of the saw bar. The sprocket is rotated on roller bearings that are supported by an inner race member that is fastened between two sideplates that form the nose of the saw bar. The means for fastening the inner race to the sideplates includes a removable lock mechanism having a pair of stud members. A stud member is inserted through each side plate to independently lock the inner race to each sideplate. With the aid of a simple tool a worn or broken sprocket can be easily removed from the saw bar and replaced with a new sprocket.

PATENTED JUN 29 1971　　　　　　　　　　　　　3,589,415
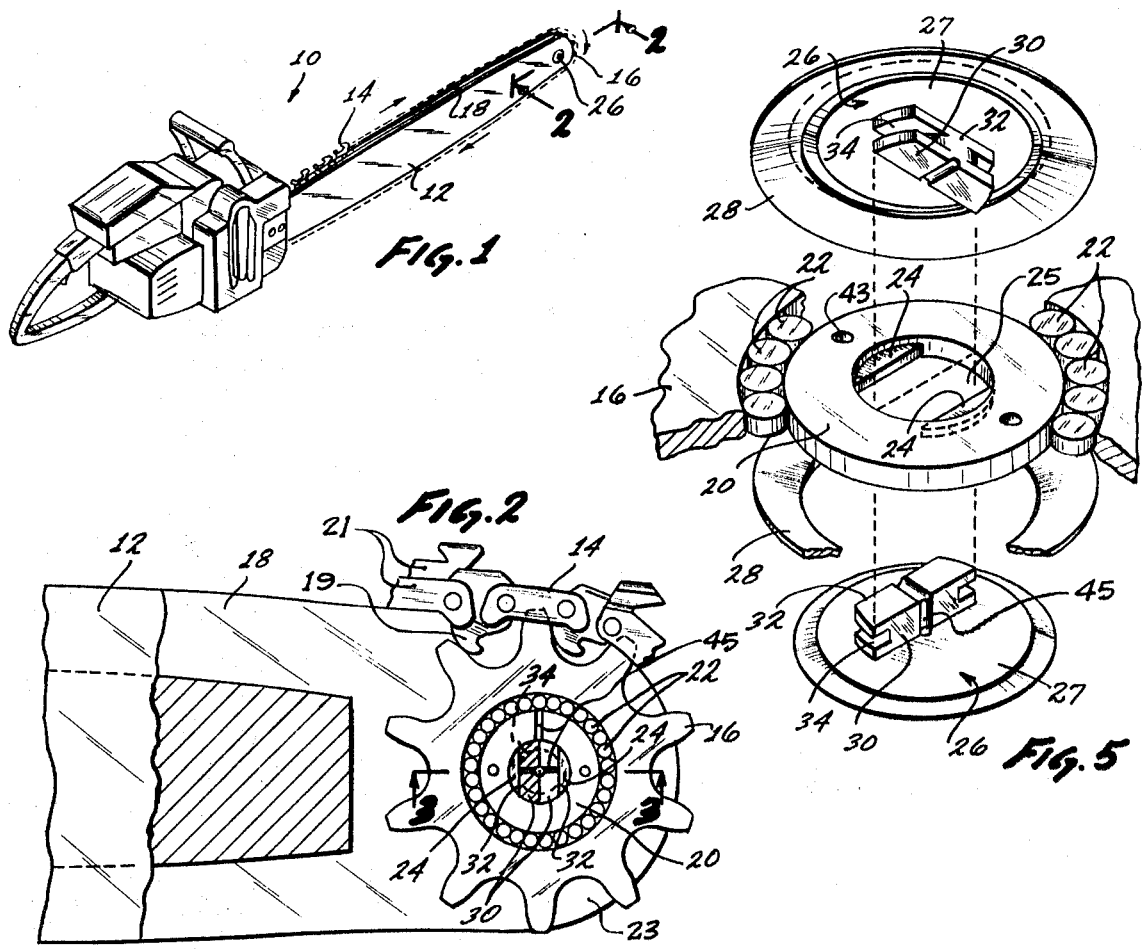
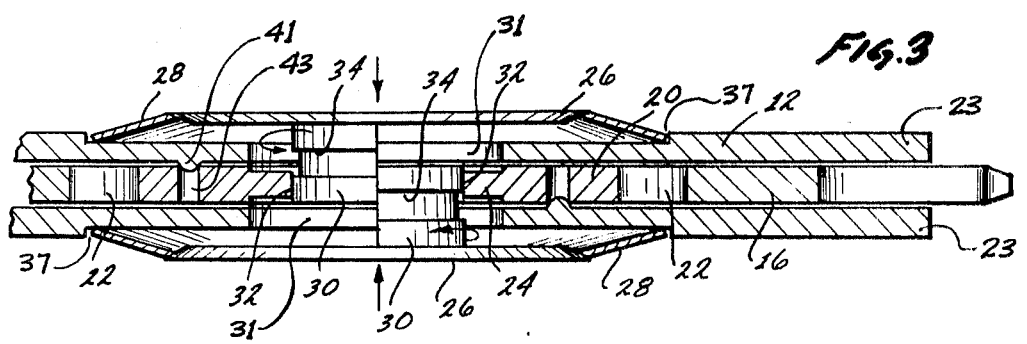
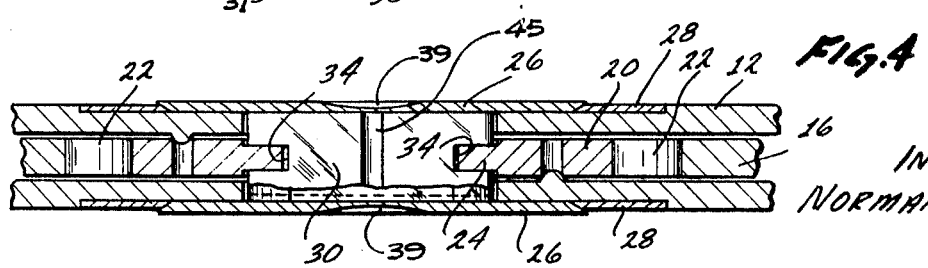
INVENTOR
NORMAN C. LOCATI
BY Robert L. Harrington
ATTORNEY

CHAIN SAW BAR

This invention relates to chain saws used for harvesting timber and more particularly to the chain saw bar on which the saw chain is supported.

It is a well-known problem in the industry that the outer end of the elongated saw bar, referred to as the nose of the saw bar, is subjected to extreme wearing. It has become recently common to provide saw bars with sprockets rotatably mounted on the nose to eliminate the sliding friction of the chain on that portion of the bar. Nevertheless the sprockets still wear out much faster than the remainder of the saw bar, and considerable savings in operating expense is realized by merely replacing the sprockets rather than the entire saw bar.

The saw chain is driven around the saw bar very rapidly and considerable and varying stresses are applied to the chain as it cuts through a log. Heretofore, in order to withstand these varying stresses and still hold the required chain guiding characteristics, the inner race on which the sprocket rotates was riveted to the bar. Where the sprockets are changed in the field by the chain saw operators, the rivets are most generally removed with a punch and hammer. This crude method of changing sprockets often causes damage to the bar and chain, is slow and tedious, and to satisfy even a minimum of success requires both know how and skill.

It is thus an object of the present invention to provide an improved means for locking the sprocket to the saw bar which satisfies the mentioned requirements and yet is easily unlocked to permit quick changing of the sprocket by the chain saw operator while he is in the field. Very generally the preferred locking means of the present invention is used to fix the inner race of the sprocket between two sideplates that form the nose of the saw bar. The locking means for the inner race includes a circular central opening in the inner race with web segments of reduced thickness closing off opposite side portions of the otherwise circular opening. A pair of studs appropriately shaped to pass through the opening have grooves which are turned to engage the web segments. The unique characteristics and advantages of the locking mechanism of the present invention will be more apparent when referring to the following detailed description and drawings wherein:

FIG. 1 is a perspective view of a chain saw such as would employ a saw bar of the present invention;

FIG. 2 is a sectioned view of the nose portion of the saw bar as taken on line 2—2 of FIG. 1;

FIG. 3 is a sectioned view as taken on line 3—3 of FIG. 2 but illustrating the sprocket unlocked from the saw bar;

FIG. 4 is a view similar to FIG. 3 but showing the sprocket locked to the saw bar; and FIG. 5 is an exploded view illustrating the various parts of the locking mechanism.

Referring to FIG. 1 of the drawings, a chain saw 10 is shown having a saw bar 12 supporting a typical saw chain 14. As will be apparent from FIG. 2, the saw bar 12 has a groove 18 provided along both the top and bottom edges forming a channel in which the drive tangs 19 of the center links of the saw chain are guided. The saw chain is supported on the saw bar by the side links 21 riding on the side rails of the groove 18. The groove 18 is substantially deeper at the nose portion of the bar forming two spaced apart sideplates 23. The spacing and deepened groove are sufficient as shown in FIG. 2 to permit the insertion of a sprocket 16 between the sideplates.

Referring to FIGS. 2 thru 5, an inner race 20 is adapted to be fastened between the sideplates 23 as will be explained later. The sprocket 16 has a circular central opening adapted to fit around the inner race with roller bearings 22 therebetween to permit free rotative movement of the sprocket around the fixed inner race. The inner race is positioned so that the sprocket teeth are inserted between the side links of the chain and so to engage the adjacent center links for lifting the chain from the bar as the chain passes around the nose.

Referring now to the means for fastening the inner race 20 between the sideplates 23, it will be seen most clearly from the exploded view of FIG. 5, that the inner race 20 has a circular central opening 25. A pair of web segments 24 of reduced thickness are oppositely located on the side of the opening 25. A pair of identical lug members 26 are provided with a flat head portion 27 and a shank portion 30. It will be noted from the dotted lines in FIG. 5 that each shank portion 30 is adapted to fit in one half of the circular opening 25 with a relief section 32 for bypassing the web segments 24. A groove 34 is provided in the shank portion 30 with a width and depth compatible with the width and depth of the web segment 24. When the shank portions 30 are properly inserted from each side into the opening 25 of the inner race, the grooves 34 are aligned with the web segments 24 and by turning the lugs the grooves will be turned onto the web segments to effectively lock the lugs onto the inner race.

The procedure for assembling comprises the steps of inserting the inner race with sprocket mounted thereon between the sideplates 23 of the saw bar so that the opening 25 is aligned with openings 31 in the sideplates. A spring washer 28 is placed on the outside of the sideplates over the openings 31 and the shank of the stud 26 is inserted through the spring washer, and the aligned openings 31 and 25 in the sideplate and inner race respectively. It will be seen from FIG. 3 that the head of the stud 26 engages the spring washer 28 before the grooves 34 of the shank are properly aligned with the web segments 24. The studs must then be forced against the spring bias of the spring washer until the head of the stud is bottomed against the sideplate as shown in FIG. 4. The various components are designed so that the proper alignment is made when this limiting position is achieved. The operator then merely turns the lugs a quarter turn, ie. 90° as with a simple screwdriver-type tool engaging a notch on the head of the stud.

It will be noted from FIGS. 3 and 4 that the sideplates 23 have recesses 37 so that when the lugs are locked in place they are essentially flush with the outer surface of the sideplates. This is important to prevent the lugs from rubbing as the chain saw bar is moved through the kerf of a tree during the cutting operation.

Another feature is the means for holding the inner race stationary between the sideplates 23. Bosses 41 are formed on the inner wall of the sideplates which engage small holes 43 provided in the inner race. The sprocket and inner race can however be easily removed after the lugs are unlocked by slightly spreading the sideplates to disengage the bosses from the holes 43. Grooves 45 are formed in the shank portions of the lugs to enable oil to be inserted into the roller bearings 22.

From the above it will be understood that a sprocket can be easily removed from the saw bar by turning either lug (which necessarily forces turning of the other lug) until the grooves 34 are disengaged from the web segments 24. The spring washer will then force the lugs partially out of the opening at which point they are easily removed (see FIG. 3). The sideplates are spread and the sprocket assembly is removed. A new assembly is inserted between the sideplates 25. The lugs are reinserted through the washer springs and sideplates into the opening of the inner race. By compressing the washer spring the grooves are aligned with the web segments. The lugs are then turned 90° relative to the inner race (which is held stationary by the bosses 41 engaging openings 43) to effect locking.

It is believed that the washer spring produces a constant pressure that compensates for the vibration and other forces to prevent the lugs from unlocking. Also the pressure against the sideplates helps to retain the proper spread to avoid undesired lateral play as the chain passes around the nose. Also it will be noted that the spring is substantially coextensive with the inner race so as not to pinch the sideplates against the rotating sprocket.

Numerous variations and modifications of the invention will be apparent to those skilled in the art. Therefore it is to be un-

What I claim is:

1. A chain saw bar for supporting and guiding a saw chain in a tree-cutting operation comprising a nose portion of spaced-apart sideplates, an inner race and a sprocket rotatably mounted on said inner race, said inner race and sprocket slidably received between the sideplates and releasable locking means for releasably locking each sideplate to the inner race, said locking means comprises a pair of stud members each with a head portion and a shank portion each sideplate having openings through which the shank portion is insertable, said inner race and the shank portion of each stud member interlocked with the head portion locking the sideplate to the inner race.

2. A chain saw bar as defined in claim 1 wherein the inner race has a circular central opening, a pair of web segments of reduced thickness are located on opposite sides of the opening to partially restrict the opening, the sideplate openings are aligned with the inner race opening, the shank portions of the stud members being inserted through the sideplate openings and into the restricted opening of the inner race, said shank portions having grooves of a width and depth compatible with the web segments, said grooves being in alignment with the web segments when the head portion of the stud member is abutted against the sideplate, and means for turning the stud members relative to the inner race to thereby slide the web segments into the grooves of the shank portions.

3. A chain saw bar as defined in claim 2 wherein a spring washer is positioned around the shank portion between the head portion of the stud member and the sideplate for inducing constant outward pressure to inhibit accidental unlocking.

4. A chain saw bar as defined in claim 3 wherein the spring washer has an outside diameter less than the inside diameter of the sprocket.

5. A chain saw bar as defined in claim 4 wherein gripping means between the inner race and the inner walls of a sideplate inhibits rotative sliding of the inner race relative to the sideplate.